H. G. REIST.
DYNAMO ELECTRIC MACHINE.
APPLICATION FILED MAY 13, 1909.
968,420.
Patented Aug. 23, 1910.
3 SHEETS—SHEET 2.
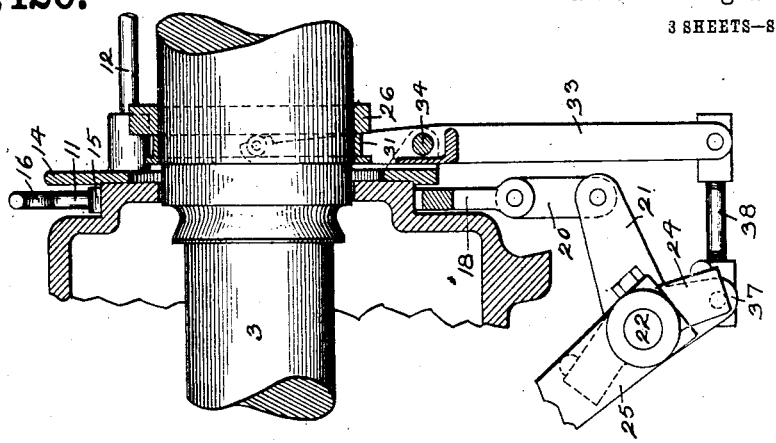
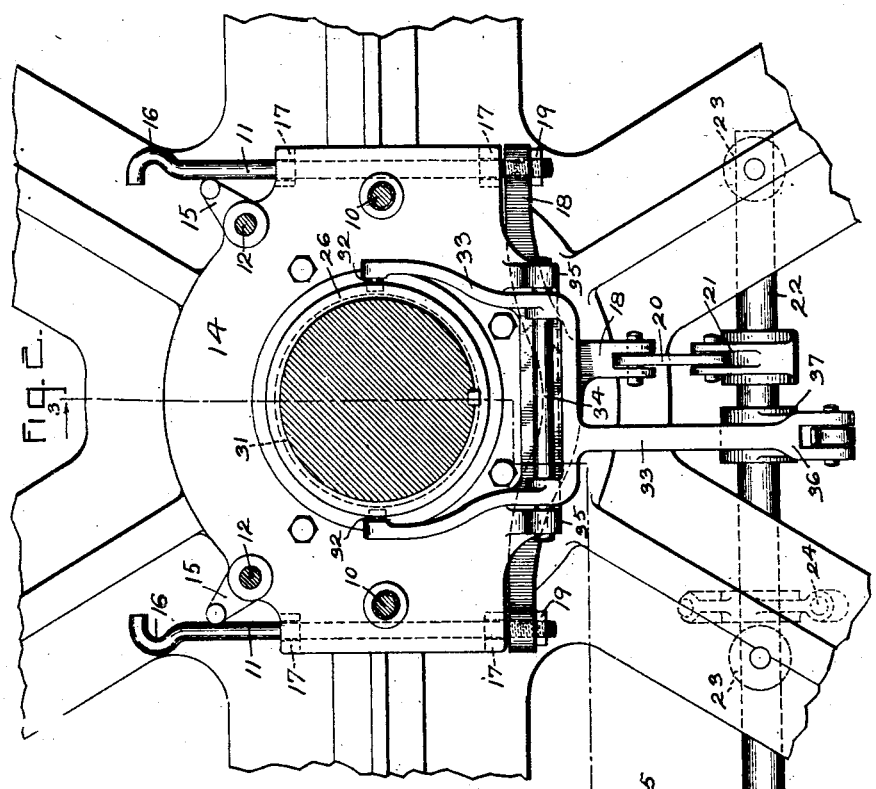
Witnesses:
W. Ray Taylor.
J. Ellis Glen
Inventor:
Henry G. Reist
By Albert G. Davis
Atty.

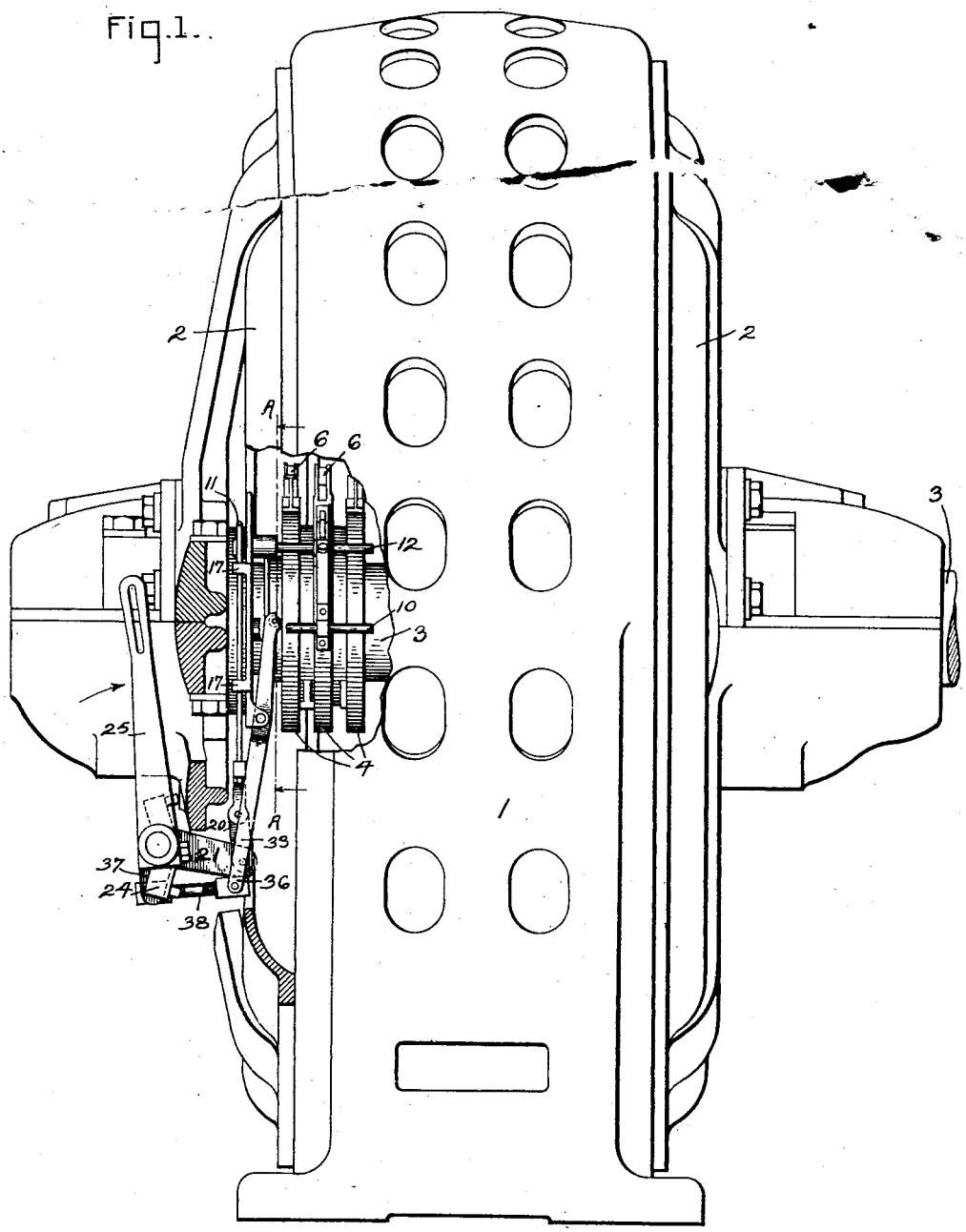

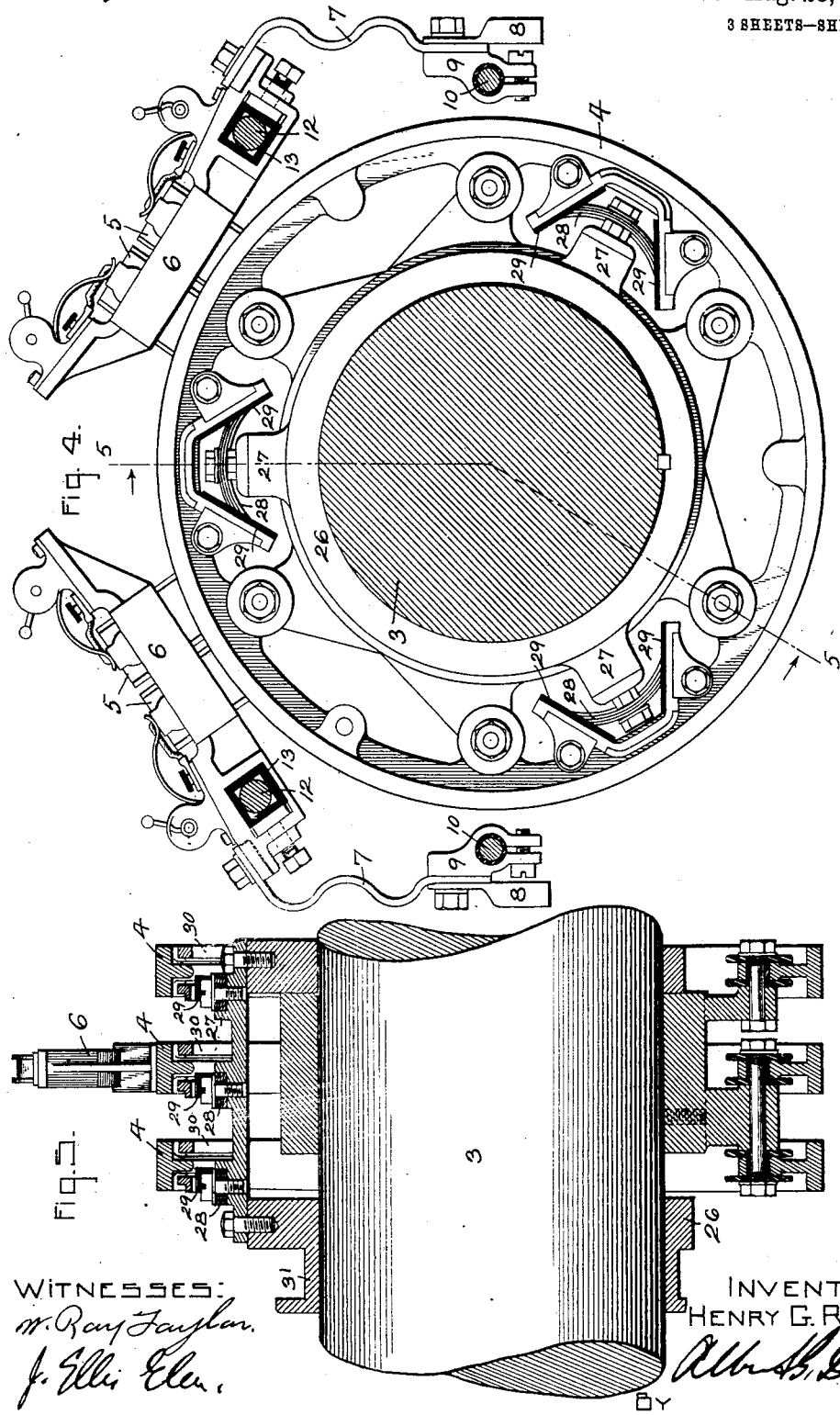

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

DYNAMO-ELECTRIC MACHINE.

968,420.   Specification of Letters Patent.   Patented Aug. 23, 1910.

Application filed May 13, 1909. Serial No. 495,703.

*To all whom it may concern:*

Be it known that I, HENRY G. REIST, a citizen of the United States, residing at Schenectady, in the county of Schenectady and State of New York, have invented certain new and useful Improvements in Dynamo-Electric Machines, of which the following is a specification.

My invention relates to dynamo-electric machines, and more particularly to the current-collecting and short-circuiting devices employed in such machines, especially of the induction motor type having coil-wound rotors.

The object of my invention is a simple arrangement and construction of parts whereby the current-collecting devices are easily moved into and out of the position in which they engage the collector rings of the induction motor and the short-circuiting device is moved out of and into the position in which it short-circuits the collector rings.

The various features of novelty which characterize my invention are pointed out with particularity in the claims annexed to and forming a part of this specification.

For a better understanding of my invention, however, reference may be had to the following description taken in connection with the accompanying drawings, in which—

Figure 1 is an elevation with parts broken away, of an induction motor having current-collecting and short-circuiting devices according to my invention; Fig. 2 is a section on the line A—A of Fig. 1 looking in the direction of the arrows; Fig. 3 is a section on the line 3—3 of Fig. 2; Fig. 4 is a section on the line A—A of Fig. 1 looking in the direction opposite to that of the arrows; and Fig. 5 is a section on the line 5—5 of Fig. 4.

Referring to the drawings, 1 is an induction motor having end shields 2 in which the rotor shaft 3 is journaled. Upon the shaft 3 is fastened a set of collector rings 4, which in the present case I have illustrated as being three in number. Brushes 5 mounted in brush-holders 6 bear upon the collector rings 4. Flexible conductors 7 are bolted at one end to the brush-holders and at the other end to terminals 8 whereby electrical connections are made to devices external to the machine. The terminals 8 and the conductors 7 may be fastened to members 9 which are in turn fastened to but insulated from the studs 10, as best shown in Fig. 4.

The brush-holders 6 are pivotally mounted and are arranged to be rotated so as to lift the brushes from engagement with the rings 4 by means of an actuating member comprising the reciprocating shifting rods 11. These rods 11 move in a direction at right angles to the studs or members 12 on which the brush-holders 6 are mounted. The brush-holders are insulated from the studs 12 by means of bushings 13. These studs 12 extend parallel to the shaft 3 and are journaled in holes in the brush-holder yoke 14 which is bolted to one of the end shields 2. To one end of each stud is fastened a lever 15, which is engaged by the hook 16 on the upper end of each rod 11. as will hereafter appear.

The rods 11 are loosely mounted in the lugs 17 cast integral with the brush-holder yoke 14. They are secured to the ends of the T-shaped shifting arm 18, preferably by being screwed therein and having their ends provided with lock-nuts 19. The link member 20 connects the lower end of the shifting arm 18 with the lever member 21 fastened on the rocker shaft 22. The rocker shaft is journaled in members 23 fastened to the legs of the end shields 2. The rocker shaft is also provided with a stop 24 for limiting its movement and with a handle 25 for rotating it.

The collector rings 4 are short-circuited by means of a device which moves longitudinally of the shaft 3 and is connected to the rocker shaft 22, and therefore, the handle 25 operates both the short-circuiting and the brush-lifting device. The short-circuiting device consists of a collar 26 slidably mounted upon the shaft. This collar is provided with members 27 to which the brushes 28 are fastened. When the collector rings are open-circuited the brushes 28 engage the insulation 29. In order to short-circuit the rings the brushes 28 are moved so as to engage the inner surfaces 30 of the collector rings. The collar 26 is provided with a groove 31 into which the pins 32 of the Y-shaped shifting lever or actuating member 33 extend. This shifting lever is pivotally mounted in the shaft 34 which is fastened in lugs 35 on the brush-holder yoke 14. The end 36 of the shifting lever is connected to the lever member 37 fastened to the rocker shaft 22 by means of a link 38.

Figs. 2 to 5 inclusive show the parts in the position in which the rings 4 are open-circuited and the brushes 5 in contact therewith. In order to short-circuit the collector rings and move the brushes 4 out of engagement with them, the handle 25 is moved in the direction of the arrow in Fig. 1 and until the parts assume the position shown therein. Such a movement of the handle rotates the rocker shaft 22, which moves the shifting lever 33 together with the collar 26, whereby the brushes 28 are moved out of engagement with the insulation 29 and into engagement with the surface 30 of the collector rings in order to short-circuit them. The rotation of the rocker shaft also moves the shifting arm 18 downward and with it the shifting rods 11 until the hooks 16 engage the end of the levers 15 and rotate them together with the studs 12 and brush-holders 6 fastened thereto. The rotation of the brush-holders moves the brushes out of engagement with the collector rings. The rotation of the handle 25 in the opposite direction to that of the arrow in Fig. 1 removes the short-circuit between the collector rings, the brushes 28 once more engaging the insulation 29, and returns the brushes 4 into engagement with the outer surface of the collector rings, because the straight portions of the rods 11 engage the ends of the levers 15 and rotate them in the opposite direction to the rotation imparted by the hooks.

I desire it to be understood that my invention is not limited to the particular construction shown and described, and I aim in the appended claims to cover all modifications which do not depart from the spirit of my invention.

What I claim as new and desire to secure by Letters Patent of the United States is:

1. In combination with a dynamo electric machine, a set of rotating collector rings, brushes therefor, pivotally mounted brush holders for said brushes, means for rotating said brush holders comprising reciprocating shifting rods having hooks at their upper ends, said hooks engaging said brush holders for rotating the brushes away from said collector rings, the straight portions of said rods engaging said brush holders for returning said brushes into engagement with said collector rings, a handle, and means for connecting said handle to said rods.

2. In combination with a dynamo electric machine, a set of collector rings, brushes therefor, studs, brush holders for said brushes fastened to said studs, levers fastened to said studs, means for rotating said brush holders comprising reciprocating shifting rods having hooks at their upper ends, said hooks engaging said levers for rotating the brushes away from said collector rings, the straight portions of said rods engaging said levers for returning said brushes into engagement with said collector rings, a handle, and means for connecting said handle to said rods.

3. In combination with a dynamo electric machine, a brush holder yoke having lugs thereon, a set of collector rings, brushes therefor, studs supported by said yoke, brush holders for said brushes fastened to said studs, levers fastened to said studs, means for rotating said brush holders comprising shifting rods moving in said lugs, said rods having hooks at their upper ends, said hooks engaging said levers for rotating the brushes away from said collector rings, the straight portions of said rods engaging said levers for returning the brushes into engagement with said collector rings, a handle, and means for connecting said handle to said rods.

4. In combination with a dynamo electric machine, a brush holder yoke having lugs thereon, a set of collector rings, brushes therefor, studs supported by said yoke, brush holders for said brushes fastened to said studs, levers fastened to said studs, means for rotating said brush holders comprising shifting rods moving in said lugs, said rods having hooks at their upper ends, said hooks engaging said levers for rotating the brushes away from said collector rings, the straight portions of said rods engaging said levers for returning the brushes into engagement with said collector rings, a shifting arm to which said rods are fastened, a handle, and means for connecting said handle to said shifting arm.

5. In combination with an induction motor, a brush-holder yoke having lugs thereon, a set of collector rings, brushes therefor, studs supported by said yoke, brush-holders for said brushes fastened to said studs, levers fastened to said studs, means for rotating said brush-holders comprising shifting rods moving in said lugs, said rods having hooks at their upper ends for engaging said levers, a shifting arm to which said rods are fastened, a rocker shaft, a link connecting said rocker shaft to said shifting arm, and a handle for rotating said rocker shaft.

6. In combination with an induction motor, a brush holder yoke having lugs thereon, a set of collector rings, brushes therefor, studs journaled in said yoke, brush holders fastened to said studs, levers fastened to said studs, means for rotating said brush holders comprising shifting rods moving in said lugs, said rods having hooks at their upper ends, said hooks engaging said levers for rotating the brushes away from said collector rings, the straight portions of said rods engaging said levers for returning said brushes into engagement with said collector rings, a shifting arm to which said rods are fastened, a rocker shaft, a link connecting said rocker shaft to said shifting arm, and a handle for rotating said rocker shaft.

7. In combination with a dynamo-electric machine, a set of collector rings, a short-circuiting device therefor, means for moving said short-circuiting device comprising a handle, a rocker shaft and means connecting said rocker shaft to said short-circuiting device, brushes for said collector rings, studs, brush-holders for said brushes fastened to said studs, levers fastened to said studs, means for rotating said brush-holders comprising reciprocating shifting rods having hooks at their upper ends, said hooks engaging said levers for rotating the brushes away from said collector rings, the straight portions of said rods engaging said levers for returning the brushes into engagement with said collector rings, and means for connecting said rods to said rocker shaft.

8. In combination with a dynamo-electric machine, a set of collector rings, a short-circuiting device therefor, means for moving said short-circuiting device comprising a handle, a rocker shaft and means connecting said rocker shaft to said short-circuiting device, a brush-holder yoke having lugs thereon, brushes for said collector rings, pivotally mounted brush-holders for said brushes, means for rotating said brush-holders comprising shifting rods moving in said lugs and operatively associated with said brush-holders, a shifting arm to which said rods are fastened, and a link connecting said shifting arm to said rocker shaft.

In witness whereof, I have hereunto set my hand this 11th day of May, 1909.

HENRY G. REIST.

Witnesses:
BENJAMIN B. HULL,
HELEN ORFORD.